United States Patent
Park et al.

(10) Patent No.: US 10,996,432 B2
(45) Date of Patent: May 4, 2021

(54) REFLECTIVE ACTIVE VARIABLE LENS AND METHOD OF FABRICATING THE SAME

(71) Applicant: ELECTRONICS AND TELECOMMUNICATIONS RESEARCH INSTITUTE, Daejeon (KR)

(72) Inventors: Suntak Park, Daejeon (KR); Bong Je Park, Daejeon (KR); Ki-Uk Kyung, Daejeon (KR); Seung Koo Park, Sejong (KR); Sung Ryul YuN, Daejeon (KR); Seongcheol Mun, Daejeon (KR); Jeong Muk Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 120 days.

(21) Appl. No.: 16/215,424

(22) Filed: Dec. 10, 2018

(65) Prior Publication Data

US 2019/0196149 A1 Jun. 27, 2019

(30) Foreign Application Priority Data

Dec. 26, 2017 (KR) .................. 10-2017-0180012
Jun. 15, 2018 (KR) .................. 10-2018-0069223

(51) Int. Cl.
*G02B 13/00* (2006.01)
*G02B 26/08* (2006.01)
(Continued)

(52) U.S. Cl.
CPC ...... *G02B 13/0015* (2013.01); *B29D 11/0048* (2013.01); *B29D 11/00442* (2013.01);
(Continued)

(58) Field of Classification Search
CPC ............ G02B 13/0015; G02B 13/0075; G02B 26/0825; G02B 7/188; G02B 13/001;
(Continued)

(56) References Cited

U.S. PATENT DOCUMENTS 7,920,330 B2 4/2011 Aschwanden et al.
9,958,705 B2 5/2018 Blum et al.
(Continued)

FOREIGN PATENT DOCUMENTS

EP 1688775 A1 9/2006
JP 2005092175 A 4/2005
(Continued)

*Primary Examiner* — Jordan M Schwartz

(57) ABSTRACT

A reflective active variable lens includes an upper electrode, a lower electrode disposed in parallel to the upper electrode, a deformation part disposed between the upper electrode and the lower electrode, a reflective part disposed on the upper electrode, and a support part disposed to surround the deformation part. Here, the deformation part and the support part are connected to each other to provide a single structure, the deformation part is expanded from an initial shape when an electric field is formed between the upper electrode and the lower electrode, and the expanded deformation part is contracted when the electric field is removed and restored to the initial shape.

13 Claims, 13 Drawing Sheets

(51) Int. Cl.
*G02B 7/188* (2021.01)
*B29D 11/00* (2006.01)
*H04N 5/225* (2006.01)

(52) U.S. Cl.
CPC ........ *B29D 11/00817* (2013.01); *G02B 7/188* (2013.01); *G02B 13/0075* (2013.01); *H04N 5/2254* (2013.01)

(58) Field of Classification Search
CPC .............. G02B 13/0055; G02B 13/009; G02B 26/0816; B29D 11/00817; G02C 7/081; G02C 7/083; G02C 7/022
USPC ............................ 351/159.03, 159.39, 159.4
See application file for complete search history.

(56) References Cited

U.S. PATENT DOCUMENTS

| | | |
|---|---|---|
| 2005/0030438 A1 | 2/2005 | Nishioka |
| 2006/0055997 A1* | 3/2006 | Murakami ......... G02B 26/0825 359/224.1 |
| 2006/0170766 A1* | 8/2006 | Kim ................... G02B 26/0825 348/51 |
| 2007/0008634 A1 | 1/2007 | Chiu |
| 2008/0137173 A1 | 6/2008 | Kim et al. |
| 2008/0253007 A1* | 10/2008 | Ohara ................... B81B 3/0072 359/847 |
| 2010/0246037 A1* | 9/2010 | Nishio ..................... G01D 1/00 359/846 |
| 2015/0116815 A1 | 4/2015 | Park et al. |
| 2015/0234153 A1 | 8/2015 | Park et al. |
| 2016/0266376 A1* | 9/2016 | Nam .................. G02B 26/0825 |
| 2016/0299947 A1 | 10/2016 | Pangeni et al. |

FOREIGN PATENT DOCUMENTS

| | | |
|---|---|---|
| JP | 2005107044 A | 4/2005 |
| JP | 2011034096 A | 2/2011 |
| KR | 100234236 B1 | 12/1999 |
| KR | 100864691 B1 | 10/2008 |
| KR | 1020080107409 A | 12/2008 |
| KR | 1020150087778 A | 7/2015 |
| KR | 1020150098188 | 8/2015 |
| KR | 1020160110111 A | 9/2016 |
| KR | 1020170030416 A | 3/2017 |

* cited by examiner

REFLECTIVE ACTIVE VARIABLE LENS AND METHOD OF FABRICATING THE SAME

CROSS-REFERENCE TO RELATED APPLICATIONS

This U.S. non-provisional patent application claims priority under 35 U.S.C. § 119 of Korean Patent Application Nos. 10-2017-0180012, filed on Dec. 26, 2017, and 10-2018-0069223, filed on Jun. 15, 2018, the entire contents of which are hereby incorporated by reference.

BACKGROUND

The present disclosure herein relates to a reflective active variable lens and a method of fabricating the same.

In recent years, as display technologies on the basis of digital technologies for a camera, a mobile terminal, a projector, and a television has developed, high definition screens and miniaturization on related optical systems are demanded. Also, as miniaturization and convenience of optical lens systems are emphasized to acquire a high-definition image, researches for miniaturization and convenience have been actively processed.

In particular, as a high-definition image sensor is mounted to a camera module that is mounted to the mobile terminal, importance of miniaturization and functions such as a variable focal point and optical zoom have been further emphasized. In general, an actuator is used in a current mobile phone camera module to realize a variable focal point and an optical zoom function. An automatic zoom actuator serves to automatically adjust a focal point by adjusting a position of a lens. The automatic zoom actuator generally uses a voice coil motor (VCM) method and a piezo-method. The VCM method is a driving method using a current flowing through a coil and an electromagnetic force generated by a magnet. The VCM method is limited in electromagnetic wave generation and degree of precision. The piezo-method is a driving method using friction between stator and rotator. The piezo-method has a short life time due to friction and expensive costs. Also, a step motor is generally used for a method of performing an optical zoom function. This method has a limitation in terms of complex mechanism and friction and noise of a gear part because a rotating driving unit rotates a lead screw to move a movable part in a linear manner. As described above, most of typical technologies are difficult in manufacturing with low costs due to a complex structure and have a limitation in miniaturization.

In general, a typical technology of a reflective focus variable lens uses a gas or fluid pressure or an electromagnetic force. A technology using a gas or fluid pressure is difficult in miniaturization or arraying because an additional pressure regulator is necessary, and expensive in manufacturing costs because a manufacturing process and a structure are complex.

SUMMARY

The present disclosure provides a reflective active variable lens that is improved in performance.

The present disclosure also provides a method of fabricating a reflective active variable lens that is improved in process efficiency.

However, the effects of the embodiments of the inventive concept are not limited to the above description.

An embodiment of the inventive concept provides a reflective active variable lens including: an upper electrode; a lower electrode disposed in parallel to the upper electrode; a deformation part disposed between the upper electrode and the lower electrode; a reflective part disposed on the upper electrode; and a support part disposed to surround the deformation part. Here, the deformation part and the support part are connected to each other to provide a single structure, the deformation part is expanded from an initial shape when an electric field is formed between the upper electrode and the lower electrode, and the expanded deformation part is contracted when the electric field is removed and restored to the initial shape.

In exemplary embodiments, the support part may have a ring shape extending along an edge of the deformation part.

In exemplary embodiments, the support part may protrude from a bottom surface of the deformation part in a direction perpendicular to the bottom surface.

In exemplary embodiments, the reflective active variable lens may further include: a lower support trench provided at a lower portion of the support part; and an additional support part provided in the lower support trench. Here, the lower support trench may include a region in which a bottom surface of the support part is recessed, and the additional support part may have a ring shape extending in an extension direction of the support part.

In exemplary embodiments, the reflective active variable lens may further include a central hole configured to expose an inner surface of the support part and a bottom surface of the lower electrode.

In exemplary embodiments, the central hole may have a uniform diameter.

In exemplary embodiments, the central hole may have a diameter that gradually increases in a direction away from the deformation part.

In exemplary embodiments, the inner surface of the support part may have a recessed shape.

In exemplary embodiments, the lower electrode may extend along the inner surface of the support part to a bottom surface of the support part.

In exemplary embodiments, the upper electrode and the reflective part may be connected to each other to form an upper reflective electrode.

In exemplary embodiments, the reflective active variable lens may further include an upper support trench defined in an upper portion of the support part. Here, the upper support trench may include a region in which a top surface of the support part is recessed and extend along an extension direction of the support part.

In exemplary embodiments, the reflective active variable lens may further include a packaging structure extending along an edge of the support part to cover an area disposed adjacent to the edge.

In exemplary embodiments, the packaging structure may include a protruding portion that fills the upper support trench.

In exemplary embodiments of the inventive concept, a method of fabricating a reflective active variable lens includes: forming a deformation part, a support part disposed to surround the deformation part, and a body part including a central hole configured to expose a bottom surface of the deformation part and an inner surface of the support part; forming an upper electrode and a reflective part on a top surface of the deformation part in an order; and forming a lower electrode in the central hole. Here, the support part has a ring shape extending along an edge of the deformation part, the lower electrode is disposed on a bottom surface of the deformation part, and the upper electrode and the lower electrode overlap each other in a direction perpendicular to the top surface of the deformation part.

In exemplary embodiments, the forming of the body part may include: providing a liquefied polymer material on a mold structure; hardening the liquefied polymer material; and removing the mold structure.

In exemplary embodiments, the upper electrode may extend from the top surface of the deformation part to a top surface of the support part.

In exemplary embodiments, the method may further include an additional support part disposed at a lower portion of the support part. Here, the additional support part may have a ring shape extending along an extension direction of the support part.

In exemplary embodiments, the forming of the additional support part may include: forming a lower support trench having a shape in which a bottom surface of the support part is recessed at the lower portion of the support part; and inserting the additional support part into the lower support trench.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
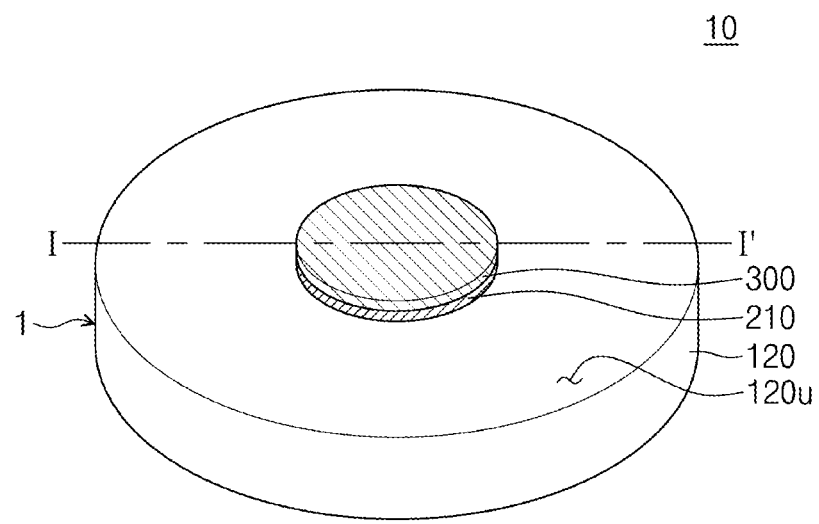
FIG. 1 is a planar perspective view illustrating a reflective active variable lens according to exemplary embodiments of the inventive concept.

Exemplary embodiments of technical ideas of the inventive concept will be described with reference to the accompanying drawings so as to sufficiently understand constitutions and effects of the inventive concept. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

Like reference numerals refer to like elements throughout. The embodiment in the detailed description will be described with cross-sectional views and/or plan views as ideal exemplary views of the inventive concept. In the figures, the dimensions of regions are exaggerated for effective description of the technical contents. Areas exemplified in the drawings have general properties, and are used to illustrate a specific shape of a semiconductor package region. Thus, this should not be construed as limited to the scope of the present invention. It will be understood that although the terms first and second are used herein to describe various elements, these elements should not be limited by these terms. These terms are only used to distinguish one component from another component. Embodiments described and exemplified herein include complementary embodiments thereof.

In the following description, the technical terms are used only for explaining a specific exemplary embodiment while not limiting the inventive concept. In this specification, the terms of a singular form may include plural forms unless specifically mentioned. The meaning of "include," "comprise," "including," or "comprising," specifies a property, a region, a fixed number, a step, a process, an element and/or a component but does not exclude other properties, regions, fixed numbers, steps, processes, elements and/or components.

Hereinafter, the present invention will be described in detail by explaining preferred embodiments of the invention with reference to the attached drawings.

Figure 2:
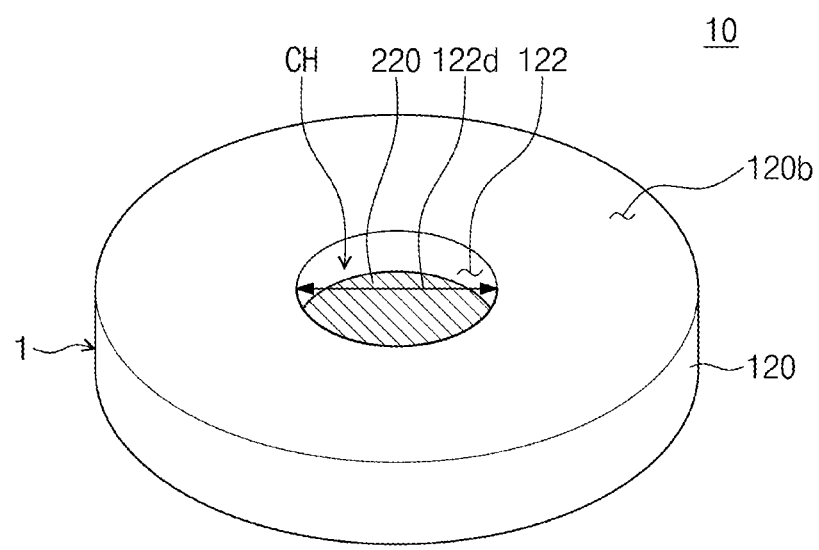
FIG. 2 is a bottom perspective view illustrating the reflective active variable lens in FIG. 1.
Figure 3:
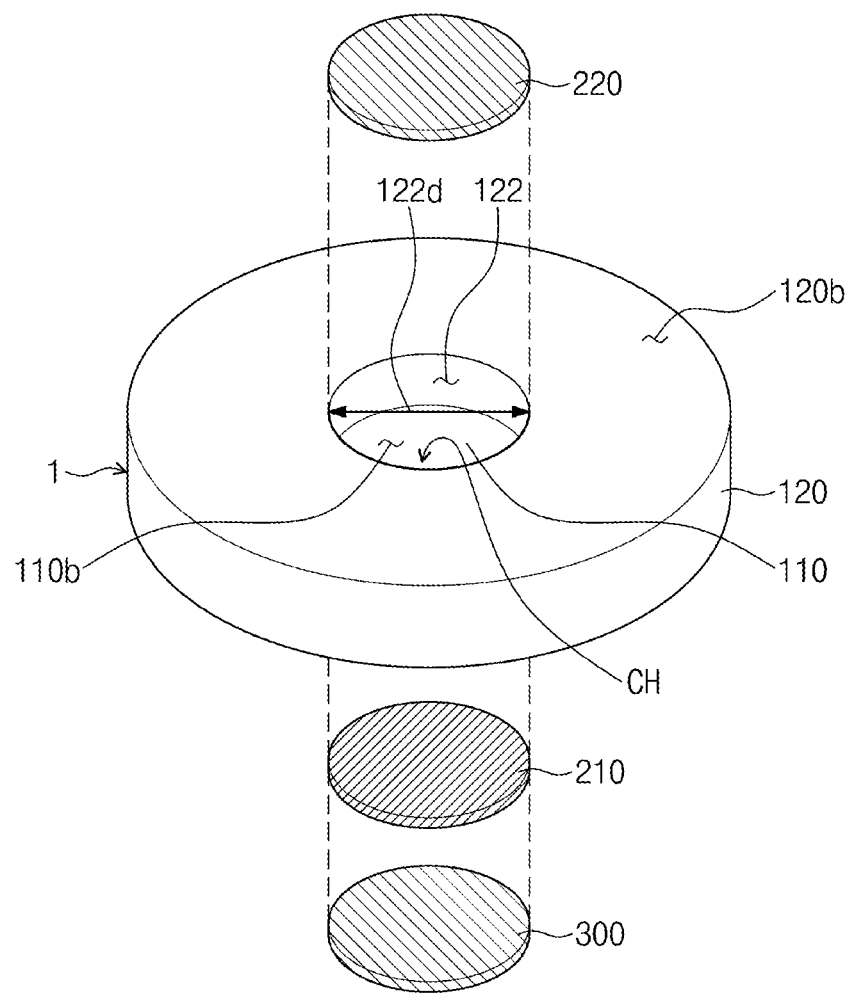
FIG. 3 is an exploded perspective view illustrating the reflective active variable lens in FIG. 2.
Figure 4:
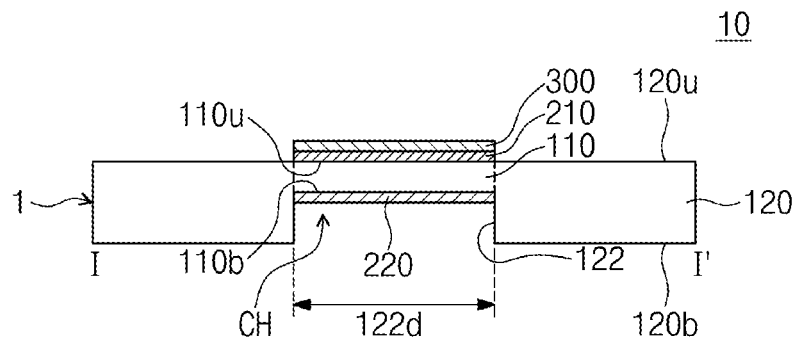
FIG. 4 is a cross-sectional view taken along line I-I' in FIG. 1.

FIG. 1 is a planar perspective view illustrating a reflective active variable lens according to an embodiment of the inventive concept. FIG. 2 is a perspective view illustrating a bottom surface of the reflective active variable lens in FIG. 1. FIG. 3 is an exploded perspective view illustrating the reflective active variable lens in FIG. 2. FIG. 4 is a cross-sectional view taken along line I-I' in FIG. 1.

Referring to FIGS. 1 to 4, a reflective active variable lens 10 may include a body part 1, an upper electrode 210, a lower electrode 220, and a reflective part 300. The body part 1 may include a deformation portion 110 and a support part 120. The deformation part 110 may be deformed by an electric field passing therethrough. When an electric field is applied to the deformation part 110, the deformation part 110 may be expanded in a perpendicular direction to the electric field from an initial state. When the electric field is removed from the deformation part 110, the expanded deformation part 110 may be contracted and restored to the initial state. For example, the deformation part 110 may include an electro active polymer (EAP).

The upper electrode 210 and the lower electrode 220 may be disposed at opposite sides to each other with the deformation part 110 therebetween. The upper and lower electrodes 210 and 220 may be provided on a top surface 110u and a bottom surface 110b of the deformation part 110, respectively. The upper electrode 210, the deformation part 110, and the lower electrode 220 may overlap in a direction perpendicular to the top surface 110u of the deformation part 110. The upper electrode 210 and the lower electrode 220 may directly contact the deformation part 110. The upper electrode 210 and the lower electrode 220 may be parallel to each other. The lower electrode 220 may be exposed by a central hole CH defined in a lower portion of the body part 1. The upper electrode 210 and the lower electrode 220 may include a conductive material having flexibility. For example, the upper electrode 210 and the lower electrode 220 may include at least one of a silver nano-wire, a graphene, a carbon nano-tube, metal having flexibility, and a conductive polymer having flexibility.

The upper electrode 210 and the lower electrode 220 may be applied by different voltages from each other. Accordingly, an electric field may be formed between the upper electrode 210 and the lower electrode 220. The electric field may pas through the deformation part 110 to expand the deformation part 110.

The reflective part 300 may be provided on the upper electrode 210. The reflective part 300 may overlap in the direction perpendicular to the top surface 110u of the deformation part 110 and the upper electrode 210. The reflective part 300 may directly contact a top surface of the upper electrode 210. The reflective part 300 may be flexible. Accordingly, when the deformation part 110 is bent, the upper electrode 210 may be deformed together. The reflective part 300 may reflect light incident into the reflective part 300. For example, the reflective part 300 may include metal or a dielectric substance. For example, the reflective part 300 may include gold (Au).

The support part 120 may surround the deformation part 110. The support part 120 may have a ring shape extending along an end of the deformation part 110. The support part 120 may have a ring shape extending along an edge of the deformation part 110. As the support part 120 is connected to the deformation part 110, a single structure may be provided. That is, the support part 120 and the deformation part 110 may be connected to each other without a boundary. The support part 120 may restrict a horizontal size of the deformation part 110. The horizontal size of the deformation part 110 may be a size of the deformation part 110 in a direction parallel to the top surface 120u of the support part 120. When the deformation part 110 is expanded by the electric field passing therethrough, the deformation part 110 may not be horizontally expanded by the support part 120 and may be bent in a direction perpendicular to the top surface 120u of the support part 120. The support part 120 may include the substantially same material as the deformation part 110. For example, the support part 120 may include an electro active polymer (EAP).

The support part 120 may have a thickness greater than that of the deformation part 110. The thickness of the support part 120 may be a size of the support part 120 in the direction perpendicular to the top surface 120u of the support part 120. The thickness of the deformation part 110 may be a size of the deformation part 110 according to the top surface 110u of the deformation part 110. The top surface 120u of the support part 120 forms a coplanar surface with the top surface 110u of the deformation part 110. The support part 120 may protrude from a bottom surface 120b of the deformation part 110.

The support part 120 may have an internal diameter 122d. The internal diameter 122d of the support part 120 may be a diameter of an inner surface 122 of the support part 120. The inner surface 122 of the support part 120 may be exposed by the central hole CH defined in the lower portion of the body part 1. The internal diameter 122d of the support part 120 may be constant. For example, the internal diameter 122d of the support part 120 may be constant between the bottom surface 110b of the deformation part 110 and the bottom surface 120b of the support part 120. The inner surface 122 of the support part 120 may extend in the direction perpendicular to the top surface 120u of the support part 120. That is, the central hole CH may extend in the direction perpendicular to the top surface 120u of the support part 120 while having a predetermined sized diameter.

In general, when the deformation part and the support part are structures independent to each other (i.e., when a boundary surface exists between the deformation part and the support part), the deformation part may not be deformed to have the required shape. For example, the deformation part may be asymmetrically bent.

According to an embodiment of the inventive concept, the deformation part 110 and the support part 120 may be connected to each other to form a single structure. Accordingly, the deformation part 110 may be controlled to have the required shape. For example, the deformation part 110 may be bent to have a symmetric shape.

The reflective part 300 may be provided on the deformation part 110 and deformed in correspondence to the deformation of the deformation part 110. As the shape of the deformation part 110 is adjusted, the reflective part 300 may be controlled to have the required shape. As a result, the reflective active variable lens 10 may have a focal position that is actively adjusted by the deformation of the reflective part 300.

Figure 5:
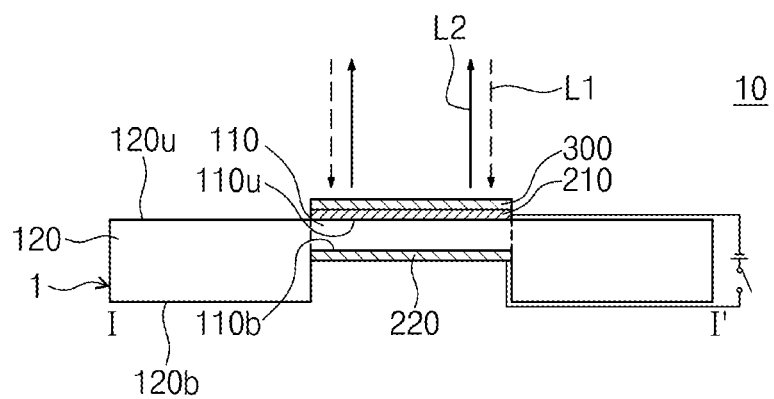
FIGS. 5 and 6 are cross-sectional views taken along line I-I' in FIG. 1 for explaining an operation of the reflective active variable lens according to exemplary embodiments of the inventive concept.
Figure 6:
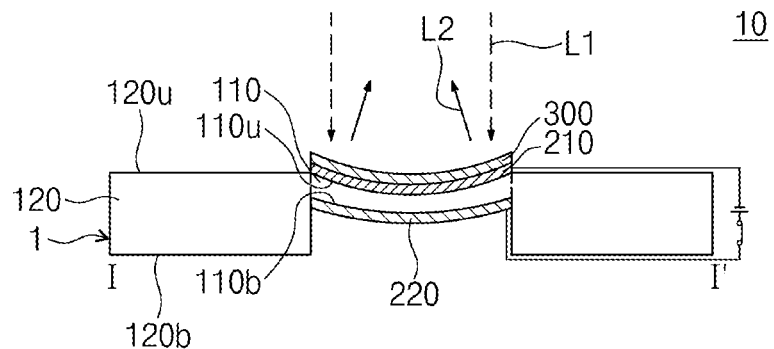

FIGS. 5 and 6 are cross-sectional views taken along line I-I' in FIG. 1 for explaining an operation of the reflective active variable lens according to an embodiment of the inventive concept. For concise description, the substantially same contents as those described with reference to FIGS. 1 to 4 will not be described.

Referring to FIG. 5, a voltage may not be applied to the upper electrode 210 and the lower electrode 220. Each of the deformation part 110 and the reflective part 300 may extend in a direction parallel to the top surface 120u of the support part 120. That is, each of the deformation part 110 and the reflective part 300 may not be bent. Accordingly, when incident light L1 is incident in parallel to an optical axis (not shown) of the reflective active variable lens 10, reflected light L2 may be reflected in parallel to the optical axis of the reflective active variable lens 10.

Referring to FIG. 6, a voltage may be applied to the upper electrode 210 and the lower electrode 220. An electric field (not shown) may be formed in the deformation part 110 in the direction perpendicular to the top surface 110u of the deformation part 110. The deformation part 110 may be expanded in a direction parallel to the top surface 110u of the deformation part 110 by the electric field. Since the horizontal size of the deformation part 110 is restricted by the support part 120, the deformation part 110 may be bent along the direction perpendicular to the top surface 120u of the support part 120. The upper electrode 210 and the reflective part 300 may be bent in correspondence to the shape of the top surface 110u of the deformation part 110. Accordingly, when the incident light L1 is incident in parallel to an optical axis (not shown) of the reflective active variable lens 10, the reflected light L2 may be collected to a focal point of the reflective active variable lens 10. A degree of deformation of the deformation part 110 may be adjusted according to a size of the voltage applied to the upper electrode 210 and the lower electrode 220. As a result, as the size of the voltage applied to the upper electrode 210 and the lower electrode 220, the focal point of the reflective active variable lens 10 may be controlled.

Figure 7:
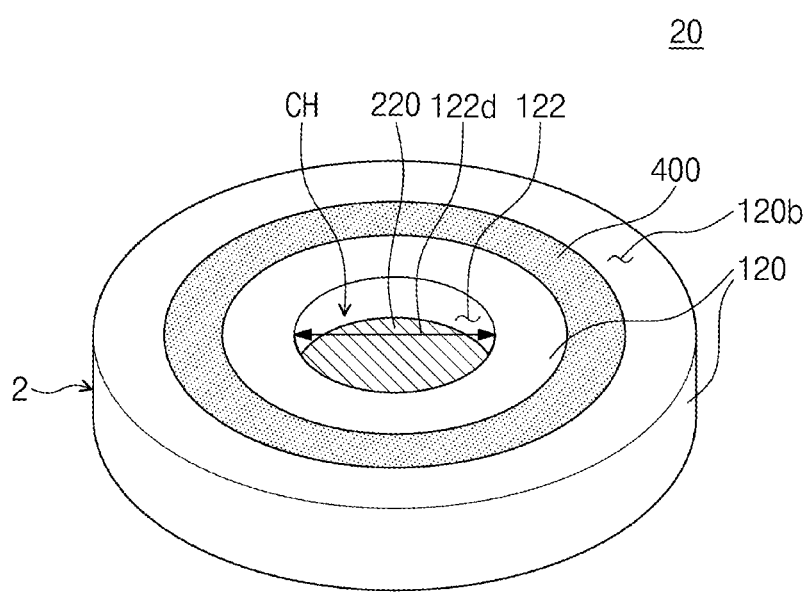
FIG. 7 is a bottom perspective view illustrating a reflective active variable lens according to exemplary embodiments of the inventive concept.
Figure 8:
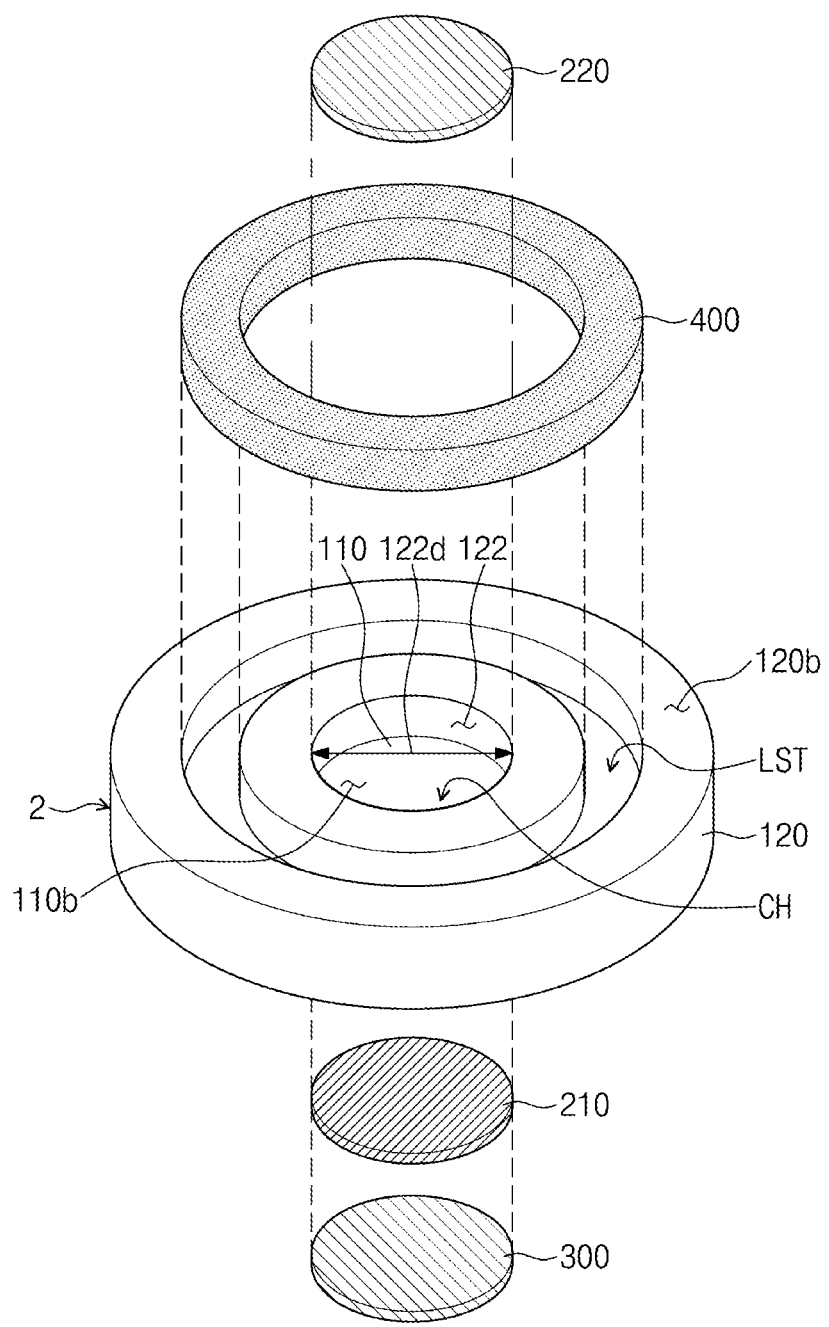
FIG. 8 is an exploded perspective view illustrating the reflective active variable lens in FIG. 7.
Figure 9:
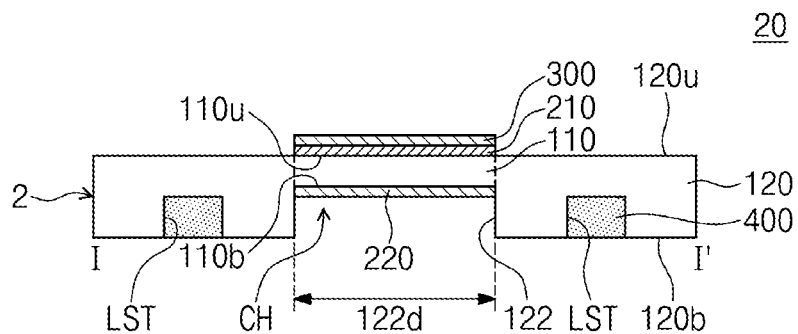
FIG. 9 is a cross-sectional view taken long line I-I' in FIG. 1.

FIG. 7 is a bottom perspective view illustrating a reflective active variable lens according to exemplary embodiments of the inventive concept. FIG. 8 is an exploded perspective view illustrating the reflective active variable lens in FIG. 7. FIG. 9 is a cross-sectional view taken long line I-I' in FIG. 1. For concise description, the substantially same contents as those described with reference to FIGS. 1 to 4 will not be described.

Referring to FIGS. 1 and 7 to 9, a reflective active variable lens 20 may include a body part 2, an upper electrode 210, a lower electrode 220, a reflective part 300, and an additional support part 400. The body part 2 may include a deformation part 110 and a support part 120. The deformation part 110, the upper electrode 210, the lower electrode 220, and the reflective part 300 may be the substantially same as the deformation part 110, the upper electrode 210, the lower electrode 220, and the reflective part 300, which are described with reference to FIGS. 1 to 4. A lower support trench LST may be provided on a lower portion of the support part 120. The lower support trench LST may be a region in which the bottom surface 120b of the support part 120 is recessed. The lower support trench LST may be provided between the inner surface 122 of the support part 120 and an outside surface (not shown). The lower support trench LST may extend in an extension direction of the support part 120. The lower support trench LST may have a ring shape. The lower support trench LST may share a central axis with the support part 120.

The additional support part 400 may be provided in the lower support trench LST. The additional support part 400 may be inserted to the lower portion of the support part 120. The additional support part 400 may extend along the lower support trench LST. The additional support part 400 may have a ring shape. The additional support part 400 may share a central axis with the support part 120. The additional support part 400 may restrict a horizontal size of the deformation part 110. The additional support part 400 may be disposed between the inner surface 122 and the outside surface of the support part. The additional support part 400 may have side surfaces and a top surface, which are covered by the support part 120. The additional support part 400 may have a bottom surface (not shown) that is exposed. The bottom surface of the additional support part 400 may form a coplanar surface with the bottom surface 120b of the support part 120. The additional support part 400 may be made of a rigid material. For example, the additional support part 400 may include acrylic. The additional support part 400 according to an embodiment of the inventive concept may restrict the horizontal size of the deformation part 110. Accordingly, when a voltage is applied to the upper electrode 210 and the lower electrode 220, the deformation part 110 may be deformed to have the required shape. Accordingly, the reflective part 300 may be deformed to have the required shape. As a result, the focal point of the reflective active variable lens 20 may be actively adjusted.

Figure 10:
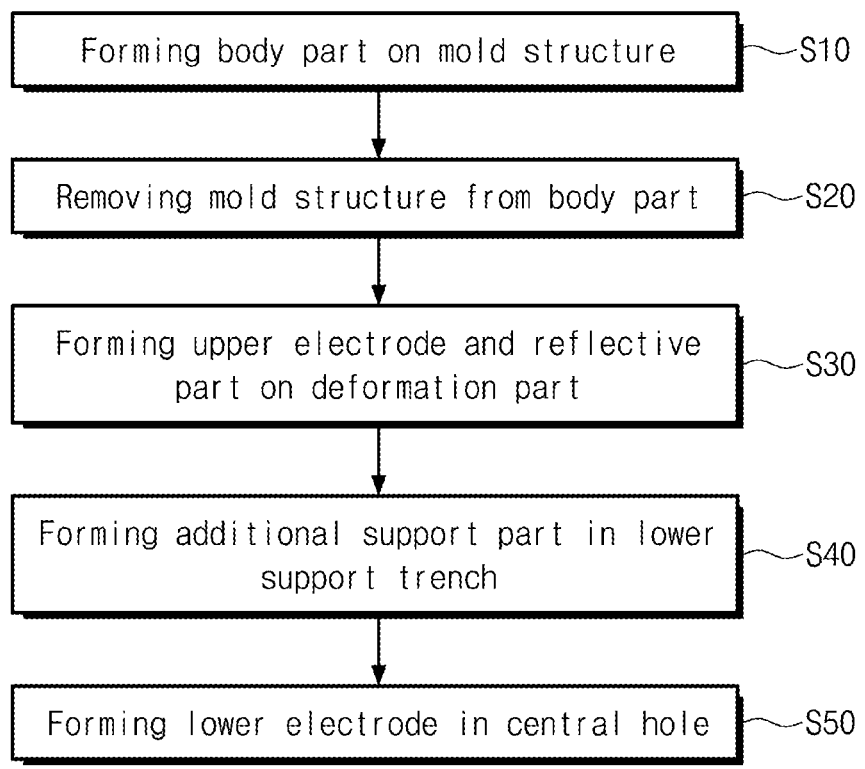
FIG. 10 is a flowchart for explaining a method of fabricating another reflective active variable lens according to exemplary embodiments of the inventive concept.
Figure 11:
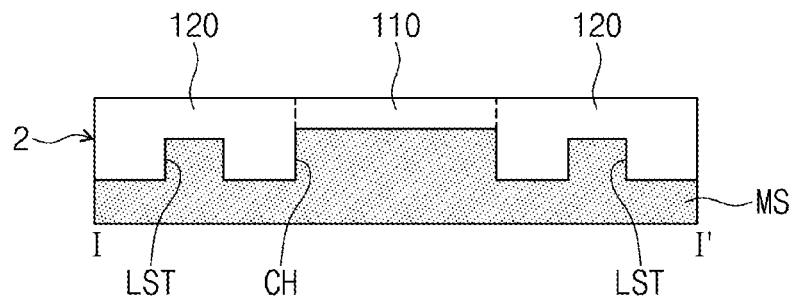
FIGS. 11 to 14 are cross-sectional views taken along line I-I' in FIG. 1 for explaining the method of fabricating another reflective active variable lens according to exemplary embodiments of the inventive concept.
Figure 14:
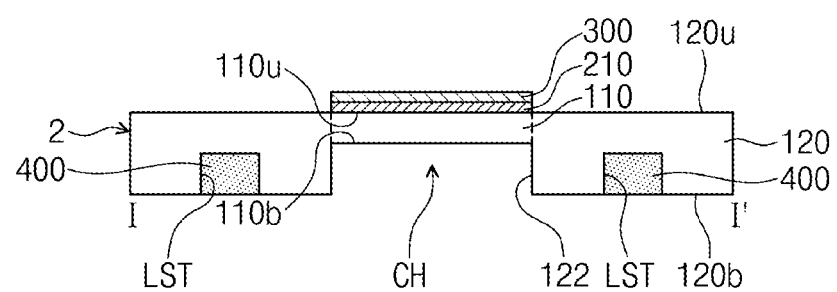

FIG. 10 is a flowchart for explaining a method of fabricating another reflective active variable lens according to exemplary embodiments of the inventive concept. FIGS. 11 and 14 are cross-sectional views taken along line I-I' in FIG. 1 for explaining the method of fabricating another reflective active variable lens according to exemplary embodiments of the inventive concept.

Referring to FIGS. 10 and 11, a body part 2 may be formed on a mold structure MS in operation S10. The body part 2 may include a deformation part 110 and a support part 120. The deformation part 110 and the support part 120 may be the substantially same as the deformation part 110 and the support part 120, which are described with reference to FIGS. 7 to 9. The mold structure MS may have a concave-convex structure to form a central hole CH and a lower support trench LST in a lower portion of the body part 2. The mold structure MS may be made of a rigid material. For example, the mold structure MS may include metal.

Forming of the body part 2 may include providing a liquefied polymer material (not shown) on the mold structure MS and hardening the liquefied polymer material. For example, the providing of the liquefied polymer material may include applying a liquefied polymer material on the mold structure MS. The providing of the liquefied polymer material may be performed until when a top surface of the mold structure MS is sunk by the liquefied polymer material. The liquefied polymer material provided on the mold structure MS may have a flat top surface. The hardening of the liquefied polymer material may include curing the liquefied polymer material. For example, the curing of the liquefied polymer material may include heating the liquefied polymer material at a temperature of about 70° C. to 120° C. The body part 2 may be made of a flexible material. Accordingly, the body part 2 may be bent or stretched. For example, the body part 2 may include an electro active polymer (EAP).

Figure 12:
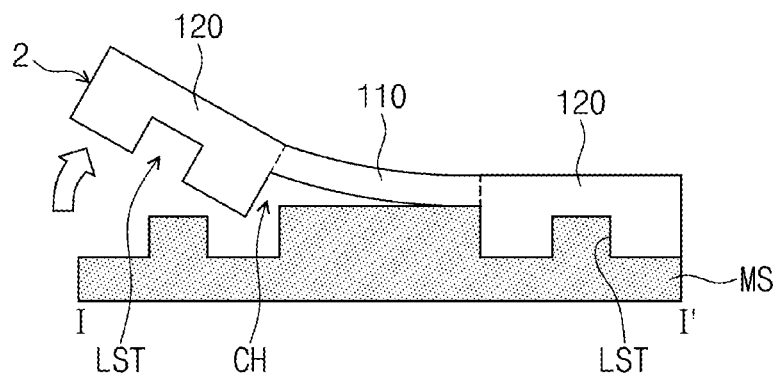

Referring to FIGS. 10 and 12, the mold structure MS may be removed from the body part 2 in operation S20. For example, a force for separating the mold structure MS and the body 2 from each other may be applied to the mold structure MS and the body 2.

Figure 13:
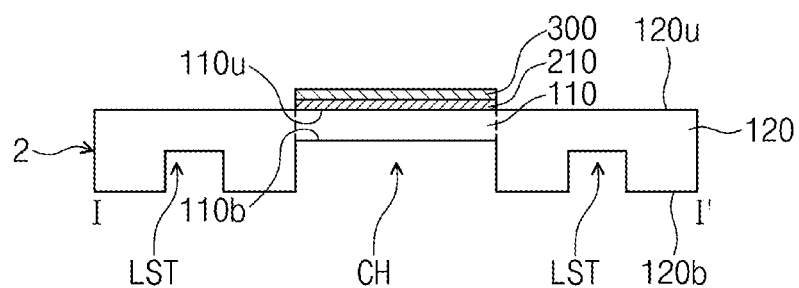

Referring to FIGS. 10 and 13, the upper electrode 210 and the reflective part 300 may be sequentially formed on the deformation part 110 in operation S30. The forming of the upper electrode 210 may include forming a conductive material layer on the top surface 110u of the deformation part 110. For example, the conductive material layer may be formed on the top surface 110u of the deformation part 110 through a spray process. For example, the conductive material layer may include a silver nano-wire, a graphene, a carbon nano-tube, metal having flexibility, and a conductive polymer having flexibility Although the upper electrode 210 and the reflective part 300 are not provided on the support part 120 in the drawing, the embodiment of the inventive concept is not limited thereto. In other exemplary embodiments, each of the upper electrode 210 and the reflective part 300 may extend from the top surface 110u of the deformation part 110 to the top surface 120u of the support part 120. That is, the reflective part 300 may completely cover the top surface 110u of the deformation part 110 and partially cover the top surface 120u of the support part 120.

The forming of the reflective part 300 may include forming a metal layer or a dielectric layer, which reflects light, on the top surface of the upper electrode 210. For example, the forming of a metal layer or a dielectric layer may include performing a chemical vapor deposition or a physical vapor deposition. For example, the reflective part 300 may include gold (Au).

Referring to FIGS. 10 and 14, the additional support part 400 may be formed in the lower support trench LST in operation S40. The forming of the additional support part 400 may include inserting a ring made of a rigid material into the lower support trench LST. For example, the additional support part 400 may include acrylic.

Referring to FIGS. 9 and 10, the lower electrode 220 may be formed in the central hole CH in operation S50. The forming of the lower electrode 220 may include forming a conductive material layer on the bottom surface 110b of the deformation part 110. For example, the conductive material layer may be formed on the bottom surface 110b of the deformation part 110 through a spray process. For example, the conductive material layer may include a silver nanowire, a graphene, a carbon nano-tube, metal having flexibility, and a conductive polymer having flexibility In order to deform the deformation part into the required shape, an electric field having a uniform size is necessarily applied into the deformation part. In order to form the electric field, the lower electrode and the upper electrode are necessarily aligned with each other.

Since the lower electrode 220 according to an embodiment of the inventive concept is formed in the central hold CH, the lower electrode 220 and the upper electrode 210 may be readily aligned with each other. The alignment may represent a state in which the lower electrode 220 faces the upper electrode 210 with the deformation part 110 therebetween. For example, although the upper electrode 210 extends from the top surface of the deformation part 110 to the top surface of the support part 120, and the lower electrode 220 extends from the bottom surface 110b of the deformation part 110 to the inner surface 122 of the support, the lower electrode 220 and the upper electrode 210 may face each other with the deformation part 110 disposed therebetween. Accordingly, the deformation part 110 may be controlled to have the required shape.

Figure 15:
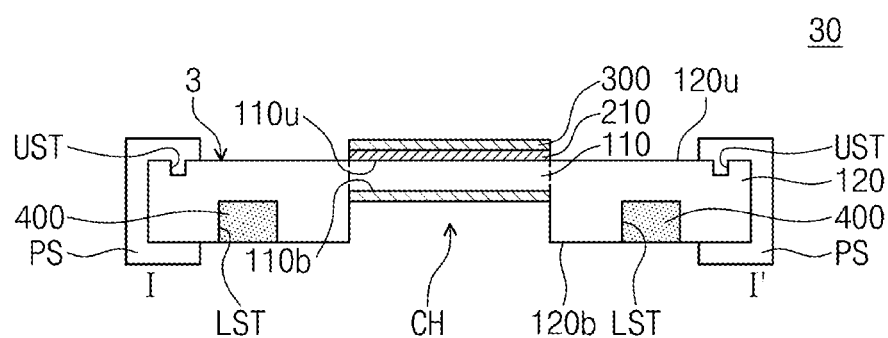
FIG. 15 is a cross-sectional view taken along line I-I' in FIG. 1 of a reflective active variable lens according to exemplary embodiments of the inventive concept.

FIG. 15 is a cross-sectional view taken along line I-I' in FIG. 1 of a reflective active variable lens according to exemplary embodiments of the inventive concept. For concise description, the substantially same contents as those described with reference to FIGS. 7 to 9 will not be described.

Referring to FIG. 15, a reflective active variable lens 30 may include a body part 3, an upper electrode 210, a lower electrode 220, a reflective part 300, an additional support part 400, and a packaging structure PS. The body part 3 may include a deformation part 110 and a support part 120. The deformation part 110, the upper electrode 210, the lower electrode 220, and the reflective part 300 may be the substantially same as the deformation part 110, the upper electrode 210, the lower electrode 220, and the reflective part 300, which are described with reference to FIGS. 7 to 9.

The support part 120 may include an upper support trench UST. The upper support trench UST may be a region in which a top surface 120u of the support part 120 is recessed. The upper support trench UST may have a ring shape. The upper support trench UST may share a central axis with the support part 120.

The packaging structure PS may surround the body part 3. The packaging structure PS may extend along an edge of the body part 3. The packaging structure PS may be made of a rigid material. The packaging structure PS may include a protruding portion that fills the upper support trench UST. The packaging structure PS may be coupled to the body part 3 by the protruding portion.

The packaging structure PS according to an embodiment of the inventive concept may be coupled to the body part 3 by the upper support trench UST. Accordingly, the reflective active variable lens 30 may be improved in structural stability.

Figure 16:
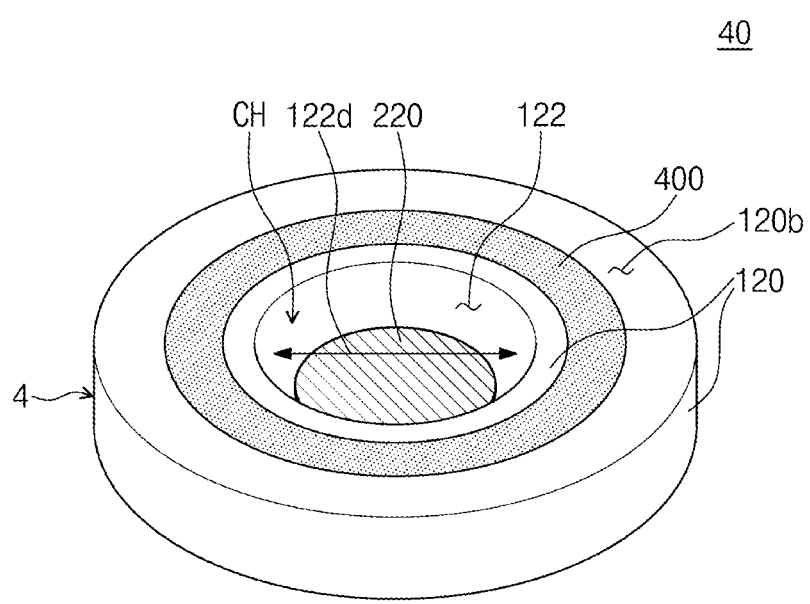
FIG. 16 is a bottom perspective view illustrating a reflective active variable lens according to exemplary embodiments of the inventive concept.
Figure 17:
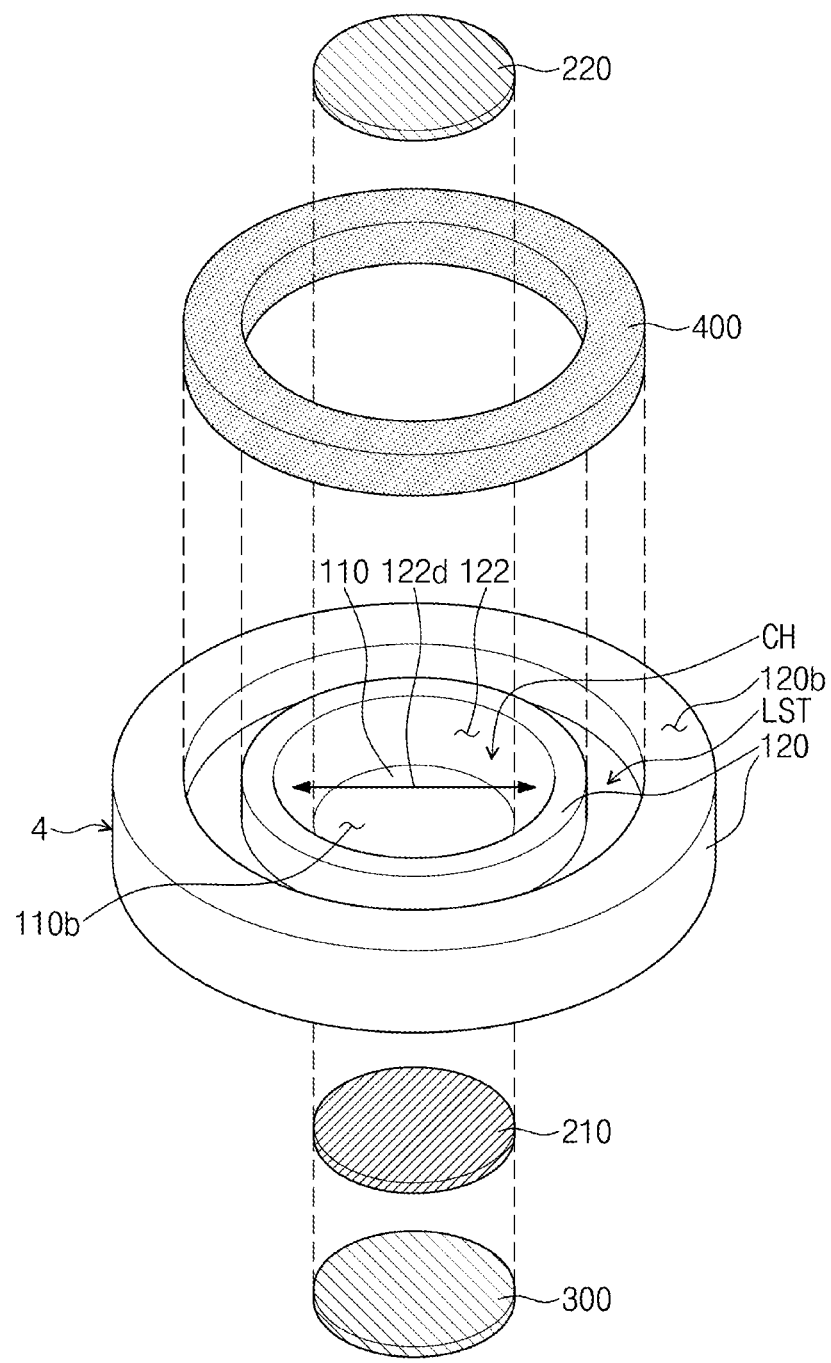
FIG. 17 is an exploded perspective view illustrating the reflective active variable lens in FIG. 16.
Figure 18:
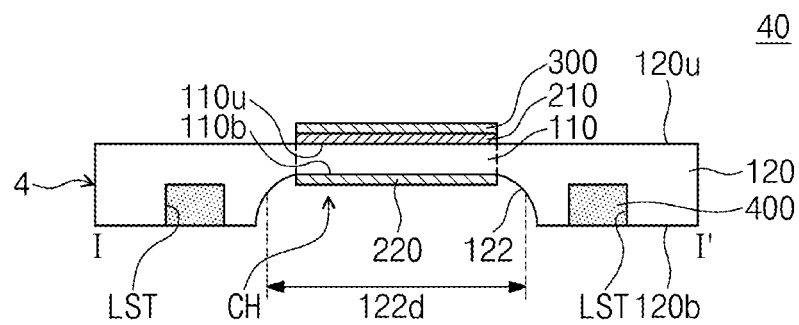
FIG. 18 is a cross-sectional view taken long line I-I' in FIG. 1.

FIG. 16 is a bottom perspective view illustrating a reflective active variable lens according to exemplary embodiments of the inventive concept. FIG. 17 is an exploded perspective view illustrating the reflective active variable lens in FIG. 16. FIG. 18 is a cross-sectional view taken along line I-I' in FIG. 1 of the reflective active variable lens in FIG. 16. For concise description, the substantially same contents as those described with reference to FIGS. 7 to 9 will not be described.

Referring to FIGS. 16 to 18, a reflective active variable lens 40 may include a body part 4, an upper electrode 210, a lower electrode 220, a reflective part 300, and an additional support part 400. The body part 4 may include a deformation part 110 and a support part 120. Except for a shape of an inner surface 122 of the support part 120, the reflective active variable lens 40 according to an embodiment of the inventive concept may be the substantially same as the reflective active variable lens 20 described with reference to FIGS. 7 to 9.

Unlike the illustration in FIG. 9, the support part 120 may have a thickness that gradually decreases in a direction toward the deformation part 110. The support part 120 may have a minimum thickness that is the substantially same as a thickness of the deformation part 110. The inner surface 122 of the support part 120 may have a recessed shape. Accordingly, the support part 120 may have an internal diameter 122d that gradually increases from a bottom surface 110b of the deformation part 110 to a bottom surface 120b of the support part 120. The internal diameter 122d of the support part 120 may be a maximum distance between two points of the inner surface 122 of the support part 120 in a direction parallel to the top surface 120u of the support part 120. Accordingly, the internal diameter 122d may have a minimum value at the same level as the bottom surface 110b of the deformation part 110 and a maximum value at the same level as the bottom surface 120b of the support part 120.

The support part 120 may have a thickness that gradually decreases in a direction toward the deformation part 110. When the deformation part 110 is expanded, a portion of the support part 120, which is disposed adjacent to the deformation part 110, may be expanded together. Accordingly, a deformation speed of the deformation part 110 may be less than that of the deformation part 110 described with reference to FIGS. 1 to 4. When the deformation speed of the deformation part is fast, an element may be deteriorated. Since the deformation part 110 according to an embodiment of the inventive concept is deformed slowly, the reflective active variable lens 40 may be improved in durability. The reflective active variable lens 40 may have a focal position that is actively adjusted by the deformation of the deformation part 110 and the reflective part 300.

Figure 19:
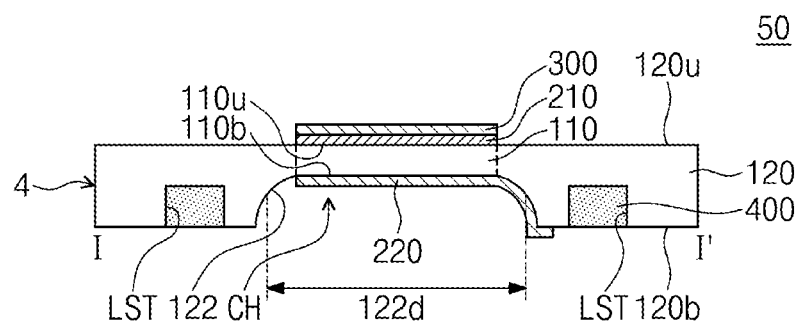
FIG. 19 is a cross-sectional view taken along line I-I' in FIG. 1 of a reflective active variable lens according to exemplary embodiments of the inventive concept.

FIG. 19 is a cross-sectional view taken along line I-I' in FIG. 1 of a reflective active variable lens according to exemplary embodiments of the inventive concept. For concise description, the substantially same contents as those described with reference to FIGS. 16 to 18 will not be described.

Referring to FIG. 19, a reflective active variable lens 50 may include a body part 4, an upper electrode 210, a lower electrode 220, a reflective part 300, and an additional support part 400. The body part 4 may include a deformation part 110 and a support part 120. Except for the lower electrode 220, the reflective active variable lens 50 according to an embodiment of the inventive concept may be the substantially same as the reflective active variable lens 20 described with reference to FIGS. 7 to 9.

Unlike the illustration in FIG. 18, the lower electrode 220 may extend along an inner surface 122 from a bottom surface 110b of the deformation part 110 to a bottom surface 120b of the support part 120. Although the additional support part 400 is not covered by the lower electrode 220 in the drawing, the embodiment of the inventive concept is not limited thereto. In other exemplary embodiments, the lower electrode 220 may be provided on a bottom surface of the additional support part 400.

Figure 20:
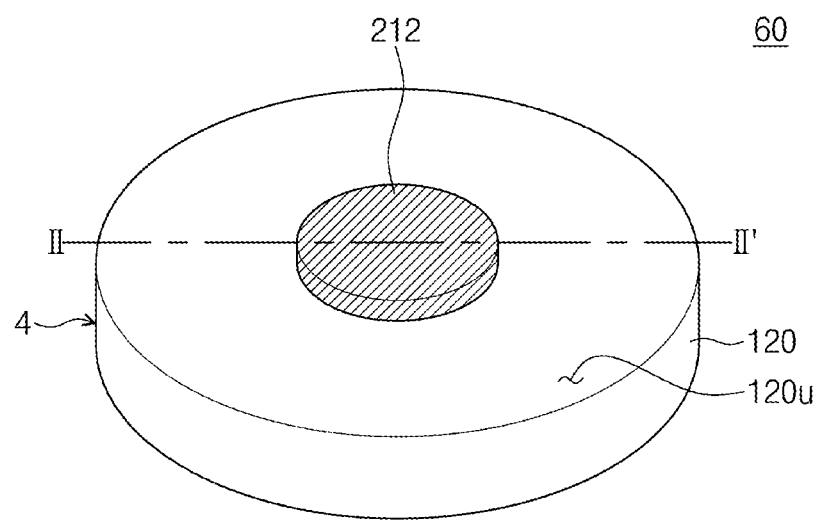
FIG. 20 is a planar perspective view illustrating a reflective active variable lens according to exemplary embodiments of the inventive concept.
Figure 21:
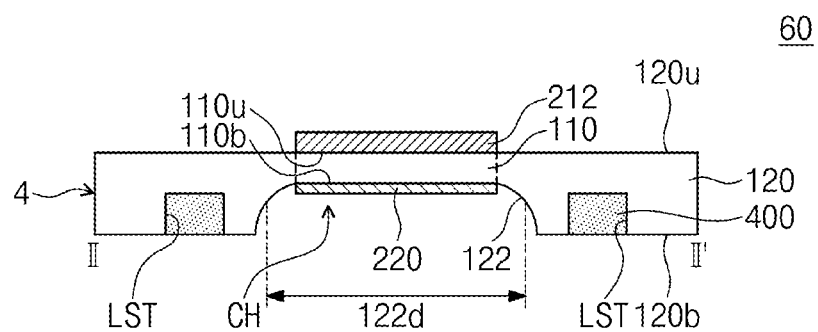
FIG. 21 is a cross-sectional view taken along line II-II' in FIG. 20.

FIG. 20 is a planar perspective view illustrating a reflective active variable lens according to exemplary embodiments of the inventive concept. FIG. 21 is a cross-sectional view taken along line II-II' in FIG. 20. For concise description, the substantially same contents as those described with reference to FIGS. 16 to 18 will not be described.

Referring to FIGS. 20 to 21, a reflective active variable lens 60 may include a body part 4, an upper reflective electrode 212, a lower electrode 220, a reflective part 300, and an additional support part 400. The body part 4 may include a deformation part 110 and a support part 120. Except for the upper reflective electrode 212, the reflective active variable lens 60 according to an embodiment of the inventive concept may be the substantially same as the reflective active variable lens 40 described with reference to FIGS. 16 to 18.

Unlike the illustration in FIG. 18, the upper reflective electrode 212 may be disposed on the deformation part 110. The upper reflective electrode 212 may have a function of each of the upper electrode 210 and the reflective part 300, which are described with reference to FIGS. 16 and 18. That is, the upper reflective electrode 212 may be applied with a voltage and reflect incident light. The upper reflective electrode 212 may include a metal thin-film having flexibility. For example, the upper reflective electrode 212 may include gold (Au).

The reflective active variable lens 60 according to an embodiment of the inventive concept may have a focal position that is actively adjusted by the deformation of the deformation part 110 and the reflective part 300.

Figure 22:
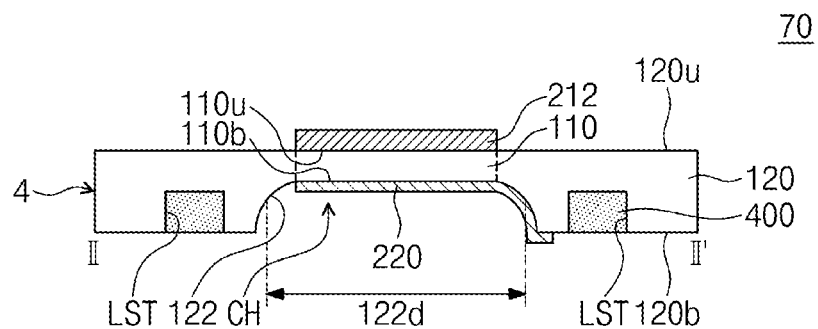
FIG. 22 is a cross-sectional view taken along line in FIG. 20 of a reflective active variable lens according to embodiments of the inventive concept.

FIG. 22 is a cross-sectional view taken along line II-II' in FIG. 20 of a reflective active variable lens according to exemplary embodiments of the inventive concept. For concise description, the substantially same contents as those described with reference to FIGS. 20 to 21 will not be described.

Referring to FIG. 22, a reflective active variable lens 70 may include a body part 4, an upper electrode 210, a lower electrode 220, a reflective part 300, and an additional support part 400. The body part 4 may include a deformation part 110 and a support part 120. Except for the lower electrode 220, the reflective active variable lens 70 according to an embodiment of the inventive concept may be the substantially same as the reflective active variable lens 60 described with reference to FIGS. 20 to 21.

Unlike the illustration in FIG. 21, the lower electrode 220 may extend along an inner surface 122 from a bottom surface 110b of the deformation part 110 to a bottom surface 120b of the support part 120. Although the additional support part 400 is not covered by the lower electrode 220 in the drawing, the embodiment of the inventive concept is not limited thereto. In other exemplary embodiments, the lower electrode 220 may be provided on a bottom surface of the additional support part 400.

According to the embodiment of the inventive concept, the reflective active variable lens may be improved in performance.

According to the embodiment of the inventive concept, the method of fabricating the reflective active variable lens may be improved in efficiency.

However, the effects of the embodiments of the inventive concept are not limited to the above description.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A reflective active variable optical component comprising:
    an upper electrode;
    a lower electrode disposed in parallel to the upper electrode;
    a deformation part disposed between the upper electrode and the lower electrode;
    a reflective part disposed on the upper electrode;
    a support part disposed to surround the deformation part;
    a lower support trench provided in a lower portion of the support part; and
    an additional support part provided in the lower support trench,
    wherein the deformation part and the support part are coupled to each other,
    the deformation part is expanded from an initial shape when an electric field is formed between the upper electrode and the lower electrode,
    the expanded deformation part is contracted when the electric field is removed and restored to the initial shape,
    the support part has a ring shape extending along an edge of the deformation part,
    the lower support trench comprises a region in which a bottom surface of the support part is recessed, and
    the additional support part has a ring shape.

2. The reflective active variable optical component of claim 1, wherein a portion of the support part protrudes from a bottom surface of the deformation part in a direction perpendicular to the bottom surface.

3. The reflective active variable optical component of claim 1, further comprising a central hole configured to expose an inner surface of the support part and a bottom surface of the lower electrode.

4. The reflective active variable optical component of claim 3, wherein the central hole has a uniform diameter.

5. The reflective active variable optical component of claim 3, wherein the central hole has a diameter that gradually increases in a direction away from the deformation part.

6. The reflective active variable optical component of claim 5, wherein the inner surface of the support part has a recessed shape.

7. The reflective active variable optical component of claim 5, wherein the lower electrode extends along the inner surface of the support part to a bottom surface of the support part.

8. The reflective active variable optical component of claim 1, wherein the upper electrode and the reflective part are connected to each other to form an upper reflective electrode.

9. The reflective active variable optical component of claim 1, further comprising an upper support trench defined in an upper portion of the support part,
wherein the upper support trench comprises a region in which a top surface of the support part is recessed.

10. The reflective active variable optical component of claim 9, further comprising a packaging structure extending along an edge of the support part to cover an area disposed adjacent to the edge.

11. The reflective active variable optical component of claim 10, wherein the packaging structure comprises a protruding portion that fills the upper support trench.

12. A reflective active variable optical component comprising:
an upper electrode;
a lower electrode disposed in parallel to the upper electrode;
a deformation part disposed between the upper electrode and the lower electrode;
a reflective part disposed on the upper electrode;
a support part disposed to surround the deformation part; and
a central hole configured to expose an inner surface of the support part and a bottom surface of the lower electrode,
wherein the deformation part and the support part are coupled to each other,
the deformation part is expanded from an initial shape when an electric field is formed between the upper electrode and the lower electrode,
the expanded deformation part is contracted when the electric field is removed and restored to the initial shape,
the support part has a ring shape extending along an edge of the deformation part,
the central hole has a diameter that gradually increases in a direction away from the deformation part, and
the lower electrode extends along the inner surface of the support part to a bottom surface of the support part.

13. A reflective active variable optical component comprising:
an upper electrode;
a lower electrode disposed in parallel to the upper electrode;
a deformation part disposed between the upper electrode and the lower electrode;
a reflective part disposed on the upper electrode;
a support part disposed to surround the deformation part;
an upper support trench defined in an upper portion of the support part; and
a packaging structure extending along an edge of the support part to cover an area disposed adjacent to the edge,
wherein the deformation part and the support part are coupled to each other,
the deformation part is expanded from an initial shape when an electric field is formed between the upper electrode and the lower electrode,
the expanded deformation part is contracted when the electric field is removed and restored to the initial shape,
the upper support trench comprises a region in which a top surface of the support part is recessed, and
the packaging structure comprises a protruding portion that fills the upper support trench.

* * * * *